United States Patent
Flood

(10) Patent No.: US 8,858,136 B2
(45) Date of Patent: Oct. 14, 2014

(54) STORAGE UNIT FOR DUNNAGE

(76) Inventor: David A. Flood, Naperville, IL (US)

(*) Notice: Subject to any disclaimer, the term of this patent is extended or adjusted under 35 U.S.C. 154(b) by 155 days.

(21) Appl. No.: 12/939,593

(22) Filed: Nov. 4, 2010

(65) Prior Publication Data

US 2011/0042330 A1  Feb. 24, 2011

Related U.S. Application Data

(62) Division of application No. 11/893,665, filed on Aug. 17, 2007, now Pat. No. 7,922,430.

(51) Int. Cl.
*B60P 7/08* (2006.01)
*B60P 7/15* (2006.01)

(52) U.S. Cl.
CPC ........................................ *B60P 7/15* (2013.01)
USPC .................. 410/32; 410/43; 410/46; 410/155

(58) Field of Classification Search
CPC ................. B65D 2519/00004; B65D 71/0092; B65D 71/0096; B65D 19/0004; B65D 19/0053; B65D 85/62; A47F 7/0014; B60P 7/10; B60P 7/12; B60P 7/0892
USPC ............. 410/32, 34, 35, 43, 121, 46, 89, 155; 211/41.1, 72; 206/451, 454, 449; 108/53.1, 53.5
See application file for complete search history.

(56) References Cited

U.S. PATENT DOCUMENTS

| | | | |
|---|---|---|---|
| 3,665,869 A * | 5/1972 | Howe | |
| 5,671,854 A * | 9/1997 | Thomas | |
| 7,131,803 B2 * | 11/2006 | Guarisco et al. | 410/35 |
| 7,922,430 B2 * | 4/2011 | Flood | 410/32 |

* cited by examiner

*Primary Examiner* — Stephen Gordon
(74) *Attorney, Agent, or Firm* — Brinks Gilson & Lione

(57) ABSTRACT

The current invention is directed to an improved storage unit for dunnage wherein the dunnage comprises load supporting plates and load locking bars, the load supporting plates being stored in a horizontal orientation.

4 Claims, 7 Drawing Sheets

STORAGE UNIT FOR DUNNAGE

This application is a divisional application, and claims priority to the filing date, of U.S. application Ser. No. 11/893,665, filed Aug. 17, 2007, and issued as U.S. Pat. No. 7,922,430 B2 on Apr. 12, 2011. U.S. Pat. No. 7,922,430 B2 is incorporated herein by reference.

BRIEF SUMMARY OF THE INVENTION

The current invention is directed to an improved storage unit for dunnage, and, more specifically, to the combination of a storage unit and dunnage wherein the dunnage comprises load locking bars and load supporting plates in a horizontal orientation.

DETAILED DESCRIPTION OF THE INVENTION

Figure 1:
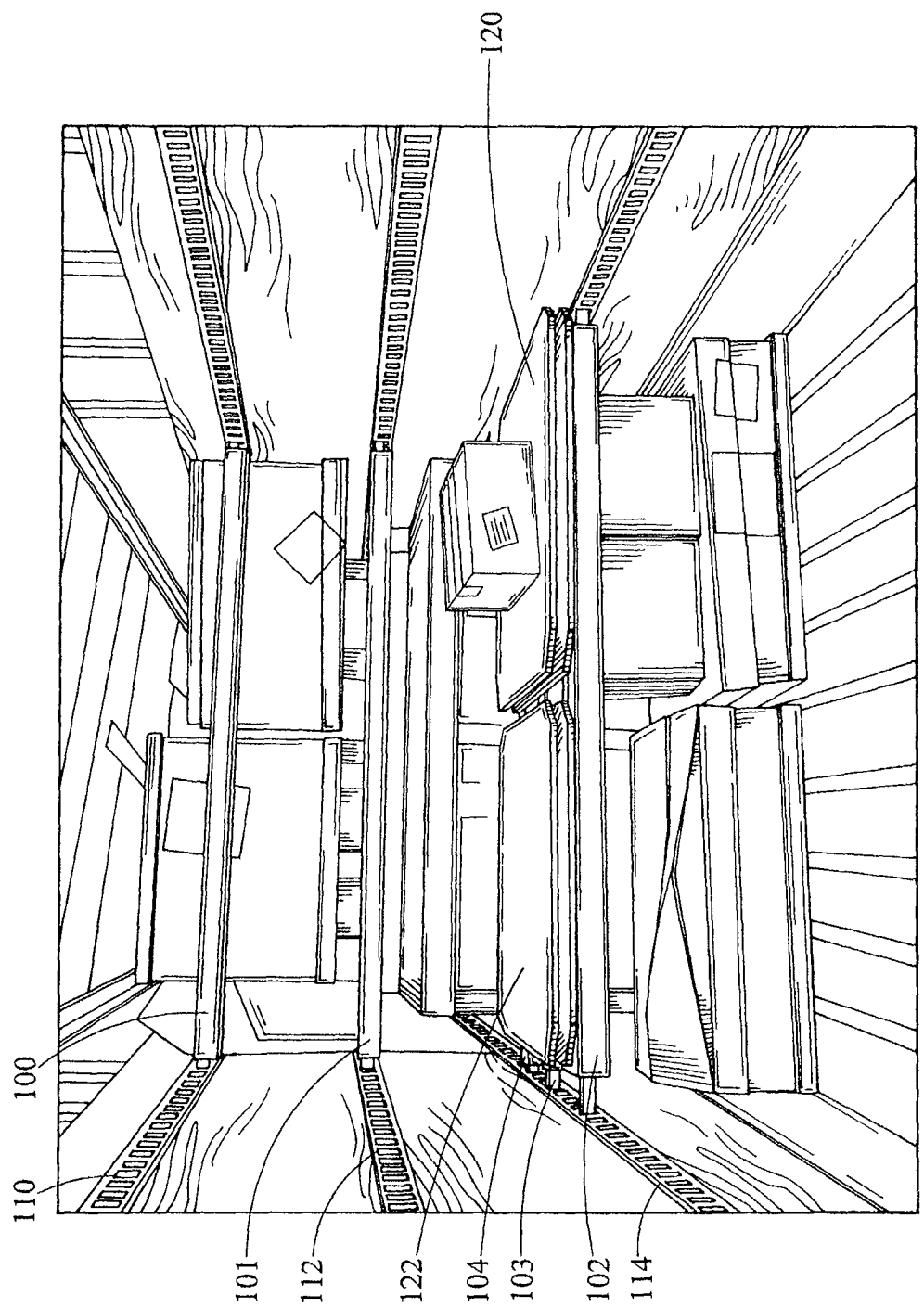
FIG. 1 illustrates dunnage consisting of lock loading bars and load supporting plates as used in a truck trailer.
Figure 1A:
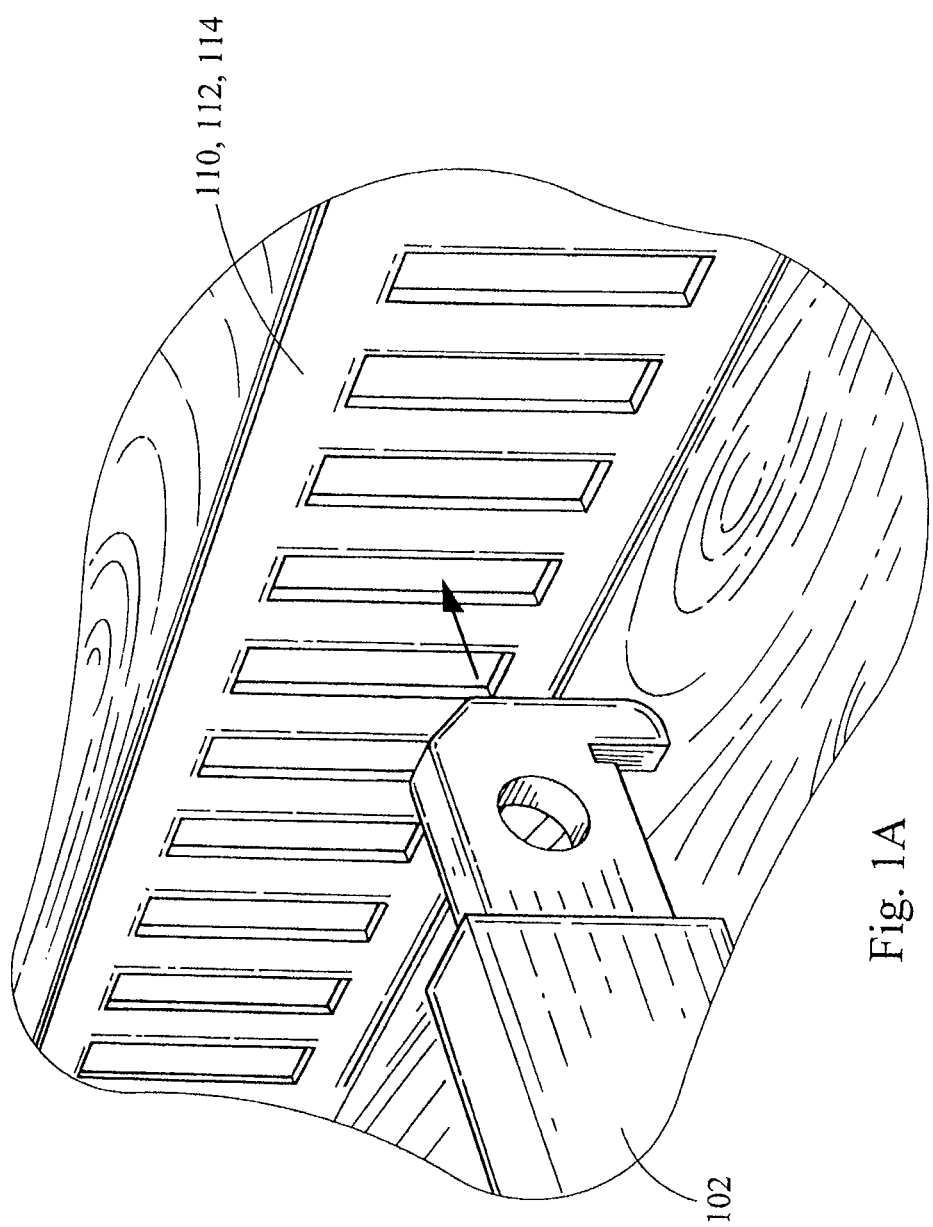
FIG. 1a illustrates the manner in which load locking bars engage a side rail in the truck trailer illustrated in FIG. 1.
Figure 2:
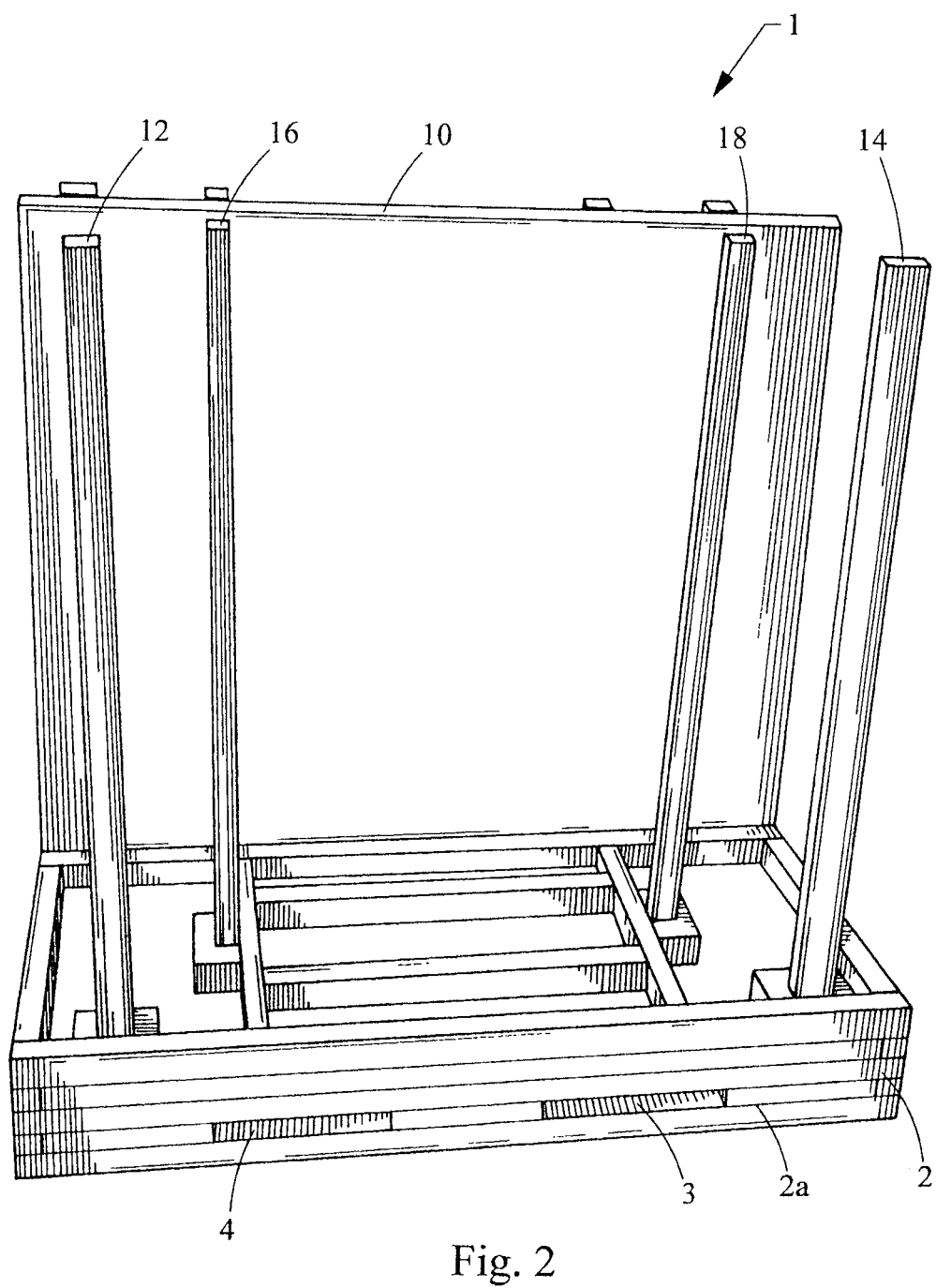
FIG. 2 is a frontal view of a storage unit according to one aspect of the invention.
Figure 3:
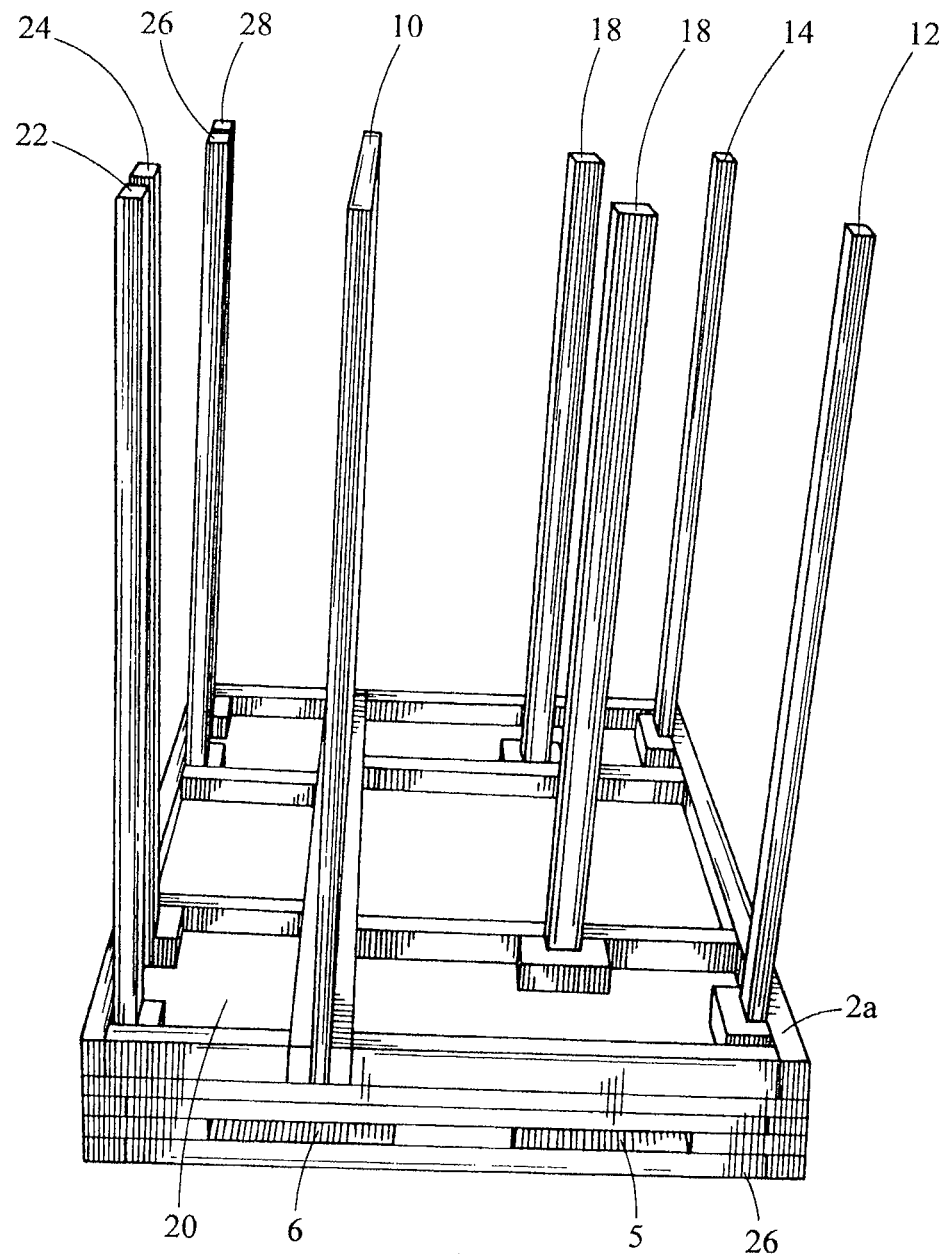
FIG. 3 is a side view of the storage unit illustrated in FIG. 2.

The current invention is directed to an improved storage unit for dunnage, especially dunnage comprising load supporting plates and load locking bars. Dunnage is used in holds and containers to protect goods and their packaging from moisture, contamination and/or mechanical damage that can result from the shifting of cargo. Floor dunnage may also be used to "lift" the cargo off the storage unit floor to protect from moisture. With respect to FIGS. 1 and 1a, the dunnage may comprise load supporting plates 120 and 122 and load locking bars 100, 101, 102, 103, and 104 is provided. The load supporting plates and the load locking bars can be used to create individual compartments within a larger storage area, as, for example, in a truck trailer. The load locking bars are preferably manufactured from aluminum or other lightweight metal alloy. The load supporting plates are preferably manufactured from wood. The load locking bars are secured to side rails 110, 112, and 114 as illustrated in FIG. 1A. The load supporting plates are then laid across the load locking bars. As illustrated in FIG. 1, dunnage is often times modular and removable. There is thus a need to efficiently and conveniently store dunnage when not in use. The current invention is directed to a new and improved storage unit for dunnage.

A preferred storage unit according to one aspect of the invention is illustrated in FIGS. 2-5. The storage unit 1 comprises a rectangular base 2. The base 2 preferably has eight spaced apart slots 3-6 (four not shown), two slots on each of the four side edges 2a, 2b, 2c, and 2d of the base 2, adapted to receive forklift blades (not shown). This allows for the easy transportation of the unit by a forklift or other similar means. Also provided is a vertical backstop 10 spanning the entire width at a rearward portion of the base 2 positioned beyond the reach of the forklift blades to be used. The purpose of the backstop 10 is to prevent the load supporting plates and load locking bars from falling while transporting the entire unit or while removing or adding dunnage. Positioned approximately halfway between the backstop 10 and the forward edge 2a of the base 2 are front vertical support beams 12, 14, 16, and 18. Front vertical support beams 16 and 18 are positioned relative to each other a distance slightly greater than the width of the load supporting plates. The purpose of front vertical support beams 16 and 18 is to limit side to side movement of the load supporting plates, as well as to prevent extreme shifting of the load bars. This will ensure that the components remain level and in a ready to use position. Positioned at a forward edge of the base are the other two front vertical support beams 12 and 14, which function to prevent the load bars from moving beyond the leading edge 2a of the base 2. They are also spaced apart at a distance to allow for the easy placement and removal of dunnage from the storage unit.

In an especially preferred embodiment, the base 2 has a rearward section 20 for storing additional load bars. The rearward section has four rear vertical support beams 22, 24, 26, and 28 positioned on the opposite side of the vertical backstop 10 from vertical support beams 12, 14, 16, and 18 discussed above. The rear vertical support beams are positioned so as to prevent load locking bars stored in rearward section 20 from falling off the storage unit.

The vertical support beams 12, 14, 16, 18, 22, 24, 26, 28 are dimensioned such that the upper ends or tops of the beams are at a height just below the vertical reach of the forklifts to be used for loading the dunnages into the storage unit. The vertical support beams should have a vertical height that allows for sufficient clearance between the upper ends of the support beams and the forklift for allowing smooth loading and unloading of the components but, at the same time, allows for maximum loading of the unit. The storage unit is preferably manufactured from steel.

Figure 4:
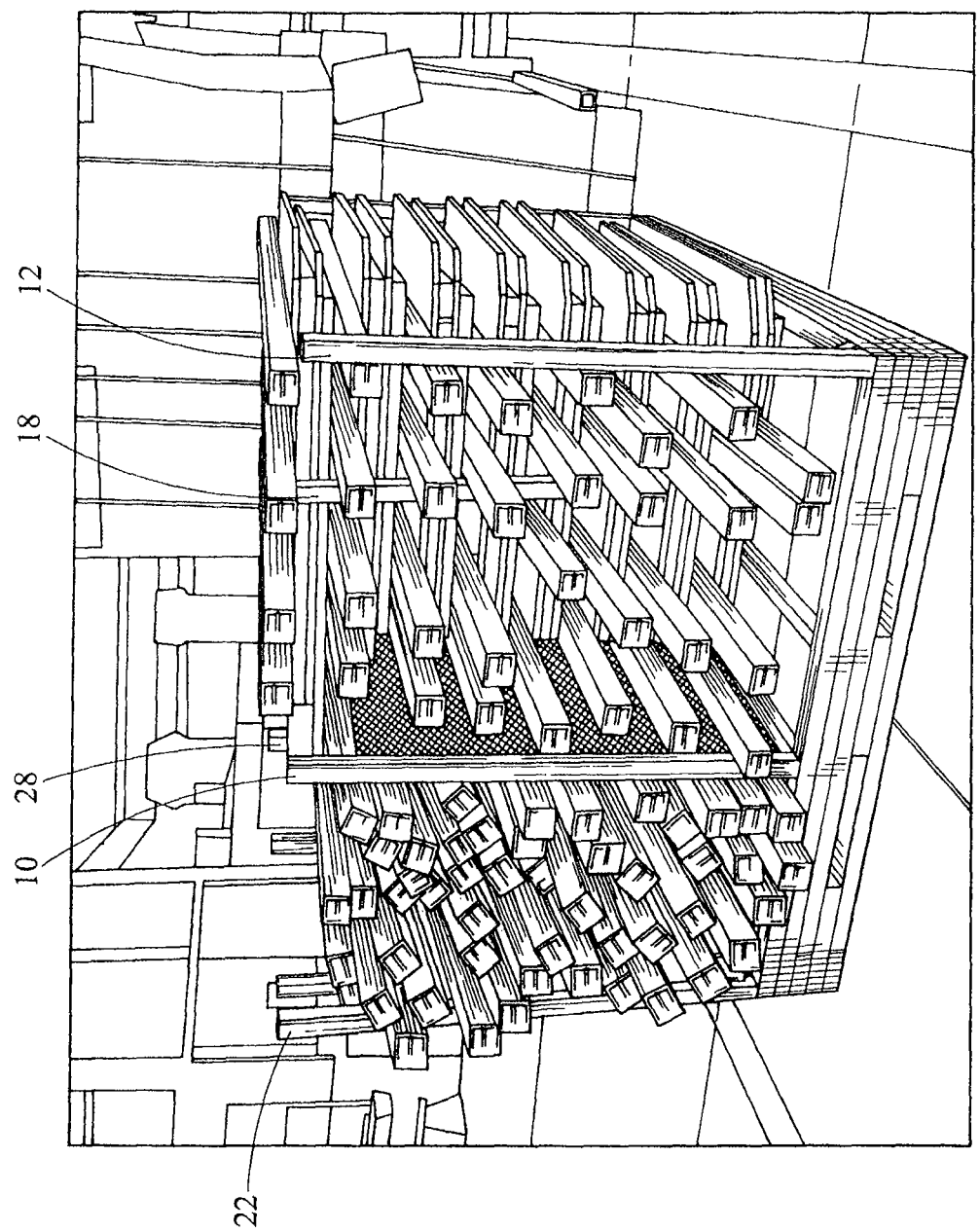
FIG. 4 is a perspective view of a storage unit according to an aspect of the invention with dunnage comprising load locking bars and load supporting plates being stored therein.
Figure 5:
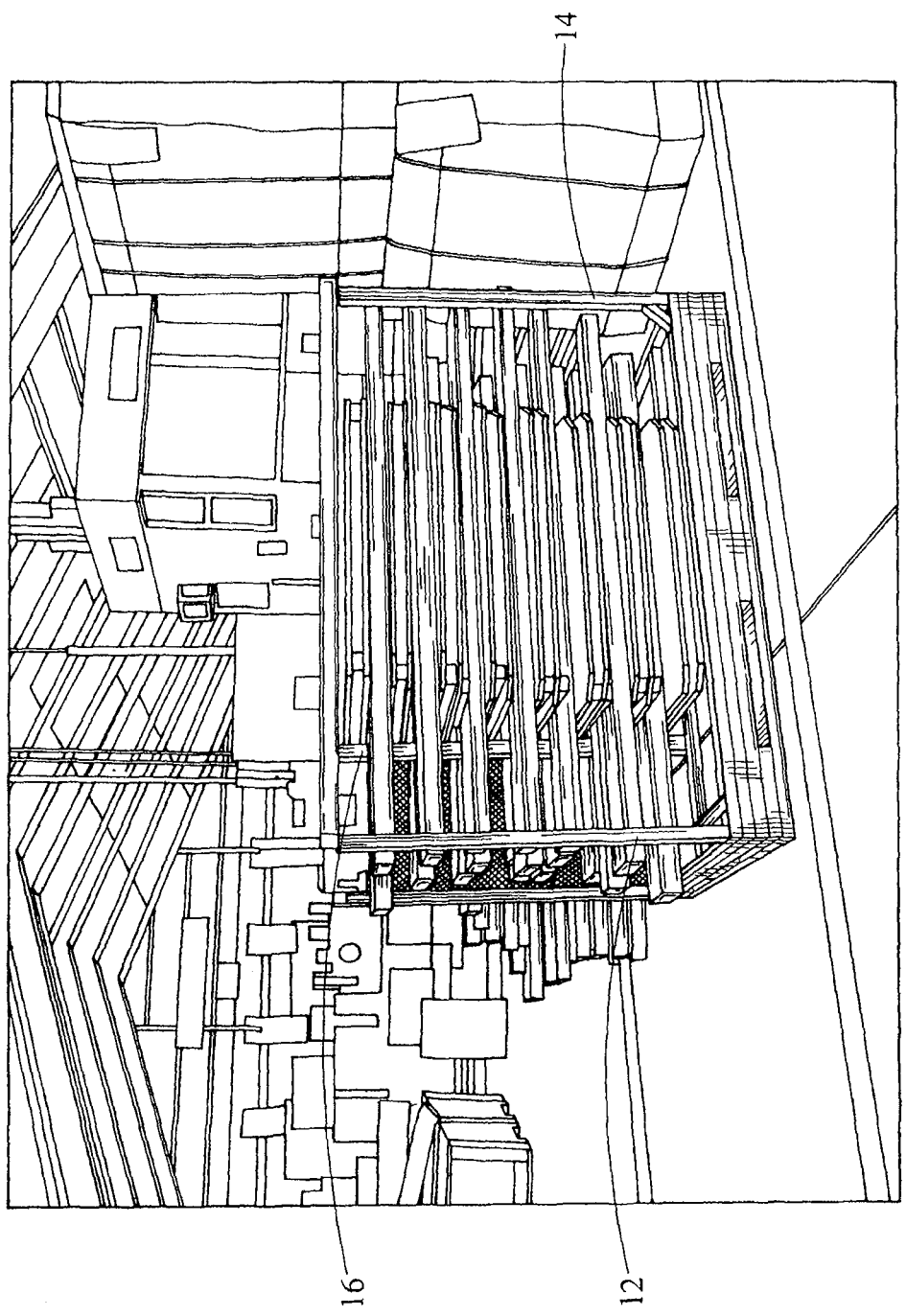
FIG. 5 another view of the storage unit and dunnage combination illustrated in FIG. 4.
Figure 6:
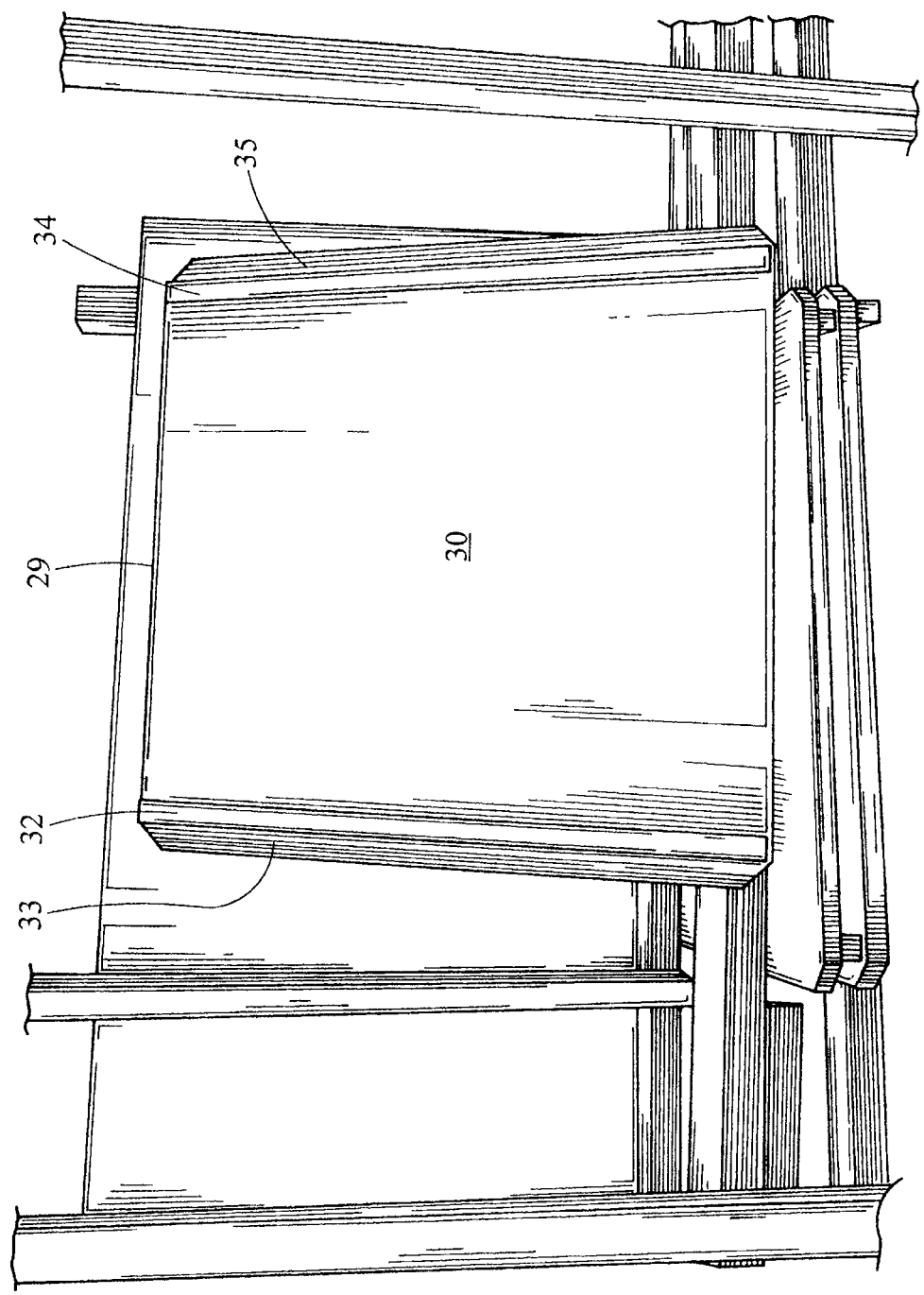
FIG. 6 is a view of an underside of a load supporting plate contemplated for use in one aspect of the invention.

A preferred load supporting plate is illustrated in FIG. 6. The load supporting plates 29 preferably has on an planar underside surface 30 with two runners 32 and 34 along opposing side edges 33 and 35, respectively, of the loading plate 29. The runners 32 and 34 are spaced apart to fit between the inside edges of the front and rear load locking bars while in use within a trailer or container. As well as to provide adequate clearance for inserting the forklift blades between each layer of dunnage when placed in or removed from the storage unit. The load supporting plates are preferably loaded into the storage unit in multiple stacks of two pieces separated by load locking bars as illustrated in FIGS. 4 and 5. As can be seen, on top of each stack of load supporting plates is placed the desired number of load locking bars. Preferably, at least one load locking bar is positioned in front of and at least one load locking bar is positioned behind the vertical support beams 16 and 18. In this manner, the load locking bars provide a secure and level support structure for the next stack of dunnage. The layering process may be repeated until the stack of load locking bars and load supporting plates is at the height of the vertical support beams.

This storage unit allows a forklift operator to simply scoop up the load supporting plates and load locking bars and transport them to the location needed. Conversely, a forklift operator unloading the load locking bars with the load supporting plates can transport them to the storage unit and simply lower them into position, ready to be used again. This process increases efficiency while reducing the risk of personal injury due to manual lifting of the dunnage.

I claim:

1. A storage unit especially adapted for storing dunnage when not in use, the storage unit comprising:
    a base comprising a length and a substantially uniform width;
    a generally planar vertical backstop with a vertical height and a horizontal width, the vertical backstop positioned substantially across the width of the base, the vertical backstop defining a forward section of the base forward of the vertical backstop and a rearward section of the base rearward of the vertical backstop;
    a first pair of vertical support beams positioned at the forward section of the base, the vertical support beams of the first pair with a vertical height and spaced apart from each other along a portion of the width of the base at a first distance;
    a second pair of vertical support beams positioned at the forward section of the base and between the vertical backstop and the first pair of vertical support beams along a portion of the length of the forward section of the base, the vertical support beams of the second pair with a vertical height and spaced apart from each other along a portion of the width of the base at a second distance, wherein the vertical height of the vertical backstop is substantially the same as the vertical height of at least one of the first and second pairs of the vertical support beams; and
    a third pair of vertical support beams positioned at the rearward section of the base.

2. The storage unit of claim 1 wherein the base comprises slots for receiving forklift blades.

3. A storage unit especially adapted for storing dunnage when not in use, the storage unit comprising:
    a base comprising a length and a substantially uniform width;
    a generally planar vertical backstop with a vertical height and a horizontal width, the vertical backstop positioned substantially across the width of the base, the vertical backstop defining a forward section of the base forward of the vertical backstop and a rearward section of the base rearward of the vertical backstop;
    a first pair of vertical support beams positioned at the forward section of the base, the vertical support beams of the first pair with a vertical height and spaced apart from each other along a portion of the width of the base at a first distance;
    a second pair of vertical support beams positioned at the forward section of the base and between the vertical backstop and the first pair of vertical support beams along a portion of the length of the forward section of the base, the vertical support beams of the second pair with a vertical height and spaced apart from each other along a portion of the width of the base at a second distance, wherein the vertical height of the vertical backstop is substantially the same as the vertical height of at least one of the first and second pairs of the vertical support beams;
    a third pair of vertical support beams positioned at the rearward section of the base; and
    a fourth pair of vertical support beams positioned at the rearward section of the base.

4. The storage unit of claim 3 wherein the base comprises slots for receiving forklift blades.

* * * * *